United States Patent [19]

Jenkofsky

[11] Patent Number: 4,867,574

[45] Date of Patent: Sep. 19, 1989

[54] ULTRA HIGH SPEED INFRARED TEMPERATURE MEASURING DEVICE

[76] Inventor: John J. Jenkofsky, 132 Forest Blvd., Ardsley, N.Y. 10502

[21] Appl. No.: 195,780

[22] Filed: May 19, 1988

[51] Int. Cl.[4] .............................................. G01J 5/16
[52] U.S. Cl. .................................... 374/121; 374/125; 374/128; 374/130; 374/132
[58] Field of Search ............... 374/121, 125, 128, 130, 374/132, 133

[56] References Cited

U.S. PATENT DOCUMENTS

| 3,766,781 | 10/1973 | Roberts | 374/128 |
| 4,435,093 | 3/1984 | Krause et al. | 374/129 |
| 4,527,896 | 7/1985 | Irani et al. | 356/43 |
| 4,634,294 | 1/1987 | Christol et al. | 374/170 |

FOREIGN PATENT DOCUMENTS

| 270299 | 6/1988 | European Pat. Off. | 374/121 |
| 2088049 | 6/1982 | United Kingdom | 374/121 |

OTHER PUBLICATIONS

8845 Low-temperature Raytube Detector 11/5/68 Leeds and Northrup Company.
"An Infrared Pyrometer for Measuring the Temperature of Turbine Blades", *Mesures.Regulation-.Automatisme*, Apr. 1976, Charpenel et al.

Primary Examiner—William A. Cuchlinski, Jr.
Assistant Examiner—W. Morris Worth

[57] ABSTRACT

A high speed infrared temperature measuring device which consists of a lens barrel in an instrument housing, a sensor in the lens barrel to read an infrared target signal, a processing circuit for the signal, an automatic circuit for the thermoelectric cooler and a black body compensation circuit and means to read and record the processed signal.

8 Claims, 10 Drawing Sheets

ULTRA HIGH SPEED INFRARED TEMPERATURE MEASURING DEVICE

The present invention relates to a high speed Infrared Non Contact Temperature measuring instrument, which is used to detect, measure and record temperature variation in the range from about 35° C. and up with instrument measurement output (response time) as fast as 25 micro seconds in a step function and 50 micro seconds to 95% of full temperature range. (Temperature range 35° C. to 205° C.).

BACKGROUND OF THE INVENTION

The need has existed over a long period of time, for a D.C. Infrared System Package with design restraints, such as, small physical size, to sense relatively low temperatures without moving mechanical parts, and with an extremely rapid response. Such a device would need, as a prime concern, good stability with respect to ambient change conditions and the ability to work in a hostile environment which could consist of vibration and heat. Also, this new Non Contact Infrared System must operate with a response time in the range of 50 micro seconds or faster. The Infrared Sensor should be able to sense temperature in the area of 35° C. to about 205° C. Such a sensor would be required to operate in a D.C. mode and with it's optical system produce a spot sensing area as small as about 6 mm at a focal distance of about 300 mm. The wave length would be in the short I.R. wave length of about from 1 to about 3.5 microns.

Those skilled in the art have found many difficulties with available sensors with respect to filling all the requirements; such as, photovoltaic, photo conductive, pyrolectric, and thermovoltaic. Sensors in the art have detectors such as PbSe, PbS and pyrolectric. These usually require a chopping or pulsing frequency to introduce sufficient change in signal response, to achieve low temperature capabilities. However, the speed of response of these devices are much too slow to accomplish the desired end in such an application. The use of Germanium or Silicon detectors would produce a fast response time, but their wave lengths in the infrared spectrum are too short, for example silicon 0.7 to 1.1, germanium 0.7 to 1.8 microns. Both silicon and germanium are not capable of low temperature sensing in the range below 250° C.

The thermopile detector which works on a thermovoltaic effect will produce a good signal at low temperature ranges, but would not produce a small spot size at 300 mm working distance and falls short on the speed requirements. Generally a themopile sensor will produce a speed of response in the milli second range. Both indium antimonide and pyro-electric sensors are consided undersirable do to their chopping requirements, or the need for liquid cooling to keep these detectors stable in a hostile environments. The physical sensor size restraint also eliminates this type of detector.

As a result, the device of the present invention was developed to be extremely fast in response, have a short wavelength range, have the capability of obtaining a small spot size at greater distances, have low temperature sensing capability, and all in a small package design. The device of the present invention utilizes the indium arsenide thermal-electrically cooled, photovoltaic mode infrared sensor. This sensor allows good stability in hostile environments, produces sufficient signal level for the low temperature requirements and allows for a low profile design package, with no moving parts or mechanical chopping. The design package, by the use of thermal-electric cooling utilizing a two stage cooler in a To-8 package, assures small target size and fast response. Such a sensor with thermoelectric-TE cooling is available, from Judson Infrared, Inc. as model #12 T.E. The present invention utilizies a DC amplification of this signal with low off set capabilities. The IC model #LF714 is used as a compensation circuit for Blackbody conditions and to allow the Infrared Sensor to sense target temperatures which are lower than its environment. The device of the present invention also contemplates the use of signal processing and linearization of the Infrared signal to a linearized analog output for display purposes in temperature in degrees Centigrade and a computer input.

SUMMARY OF THE INVENTION

The object of the present invention is to provide a device that senses and reports temperature changes in micro second response time. A further object of the present invention is to provide such a device that will operate effectively in hostile environments. An additional object of the present invention is to provide effective sensing of relatively small target areas at distances. Another object of the present invention is to provide a sensing device that will operate in the shorter end of the infrared spectrum. A further object of the present invention is to provide a sensing device with all of the above requirements and to do so in a device of sufficiently small size to fit in a restricted environment.

The forgoing and other objects of the present invention are achieved in the preferred form of the present invention by the discovery of the combination of the proper optical design, sensor package, thermoelectric cooling, compensation circuitry, electronic circuit and process signal output. The optical design consists of a lens barrel and a high quality quartz lens. The sensor package consists of a photo-voltaic mode sensor in a hermetically sealed enclosure with a one or two stage thermo-electric cooler. The compensation circuit consists of a 347 Intergrated Circuit and a bead-type thermistor and also a control bridge for TE cooling, as well as the necessary power supplies. The signal output circuit consists of a pre amplifier, amplifier, emissivity stage, and finally the linearization stage for suitable use with conventional measuring display, recording or controlling equipment.

Additional ambient temperature compensation is provided which eliminates possible drift by equipping the barrel with an air purge venturi assembly which prevents smoke from the environment and contamination from the process being observed from blocking the lens. This assures a clear and clean view of the product being sensed by the lens. A water cooling air chamber is in the housing enclosure in order to cool the entire lens sensor assembly.

DETAILED DESCRIPTION OF THE INVENTION

Figure 1:
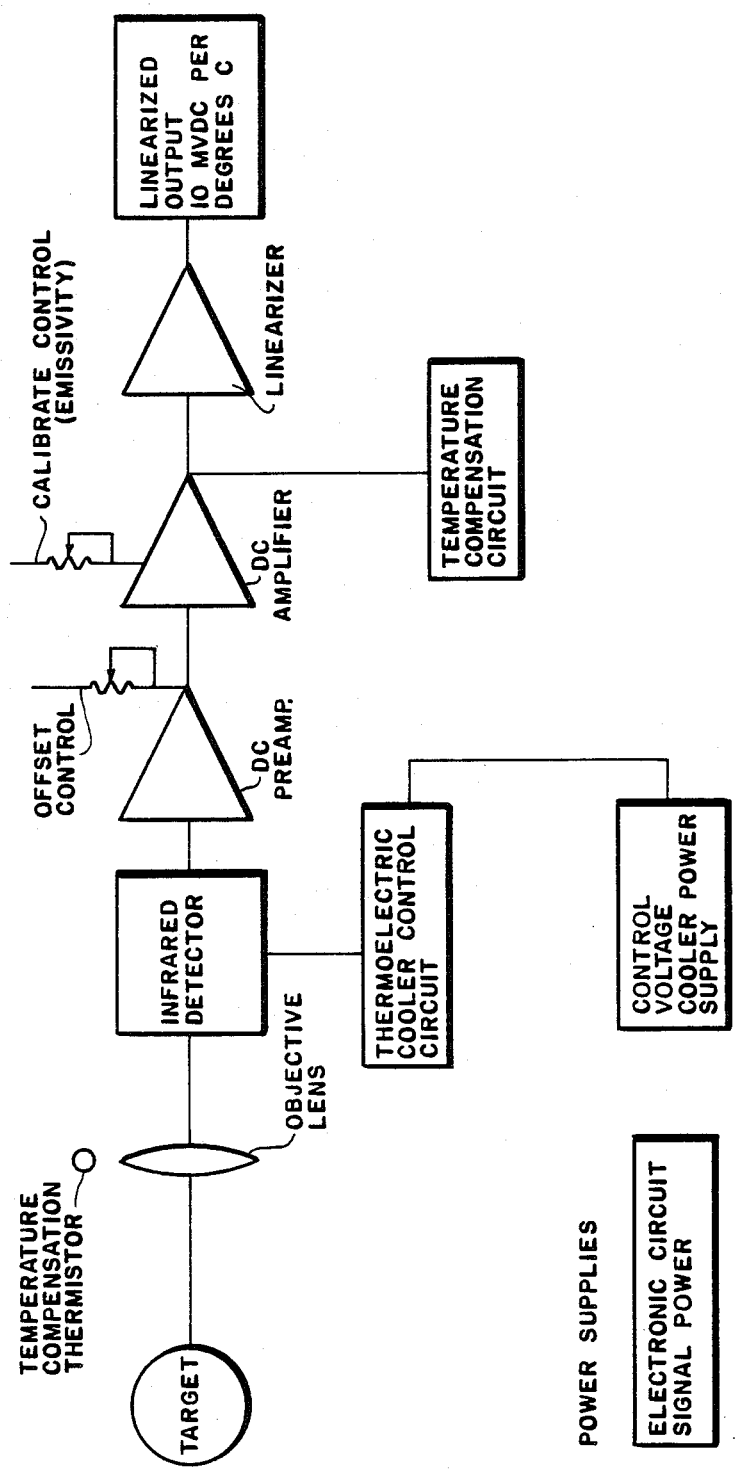
FIG. 1 is a block diagram respresenting a flow chart of the present invention.

Referring now to the drawings in detail, wherein reference numbers designate like elements, there is seen in FIG. 1 a block diagram representing a flow chart of the various sections of the high speed infrared non-contact temperature measuring instrument of the present invention with the various individual portions thereof functionally labelled.

Figure 2:
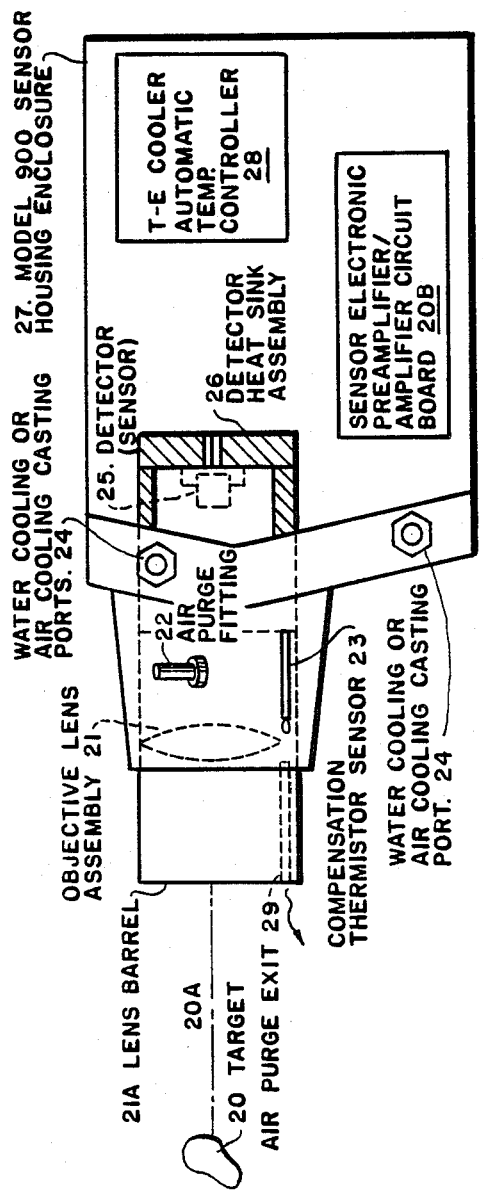
FIG. 2 is a perspective view of the device of the present invention.

FIG. 2 shows a perspective view of the temperature measuring instrument of the present invention wherein the target to be measured is shown at 20 and 20A is the infrared signal. The lens barrel is at 21A with the lens, 21, mounted therein. The air purge fitting is represented at 22. The compensation thermistor sensor 23 is imbedded in the lens barrel 21A to monitor the barrel temperature for the electronic sensing board 20B which contains the black body compensation circuit. Water or air cooling ports are shown at 24. The infrared sensor which contains the thermoelectric cooling stage is shown at 25. The lens barrel 21A has its rear portion inserted in the heat sink assembly 26 and then placed in the instrument housing 27 wherein the thermoelectric automatic temperature controller is located at 28.

Figure 3:
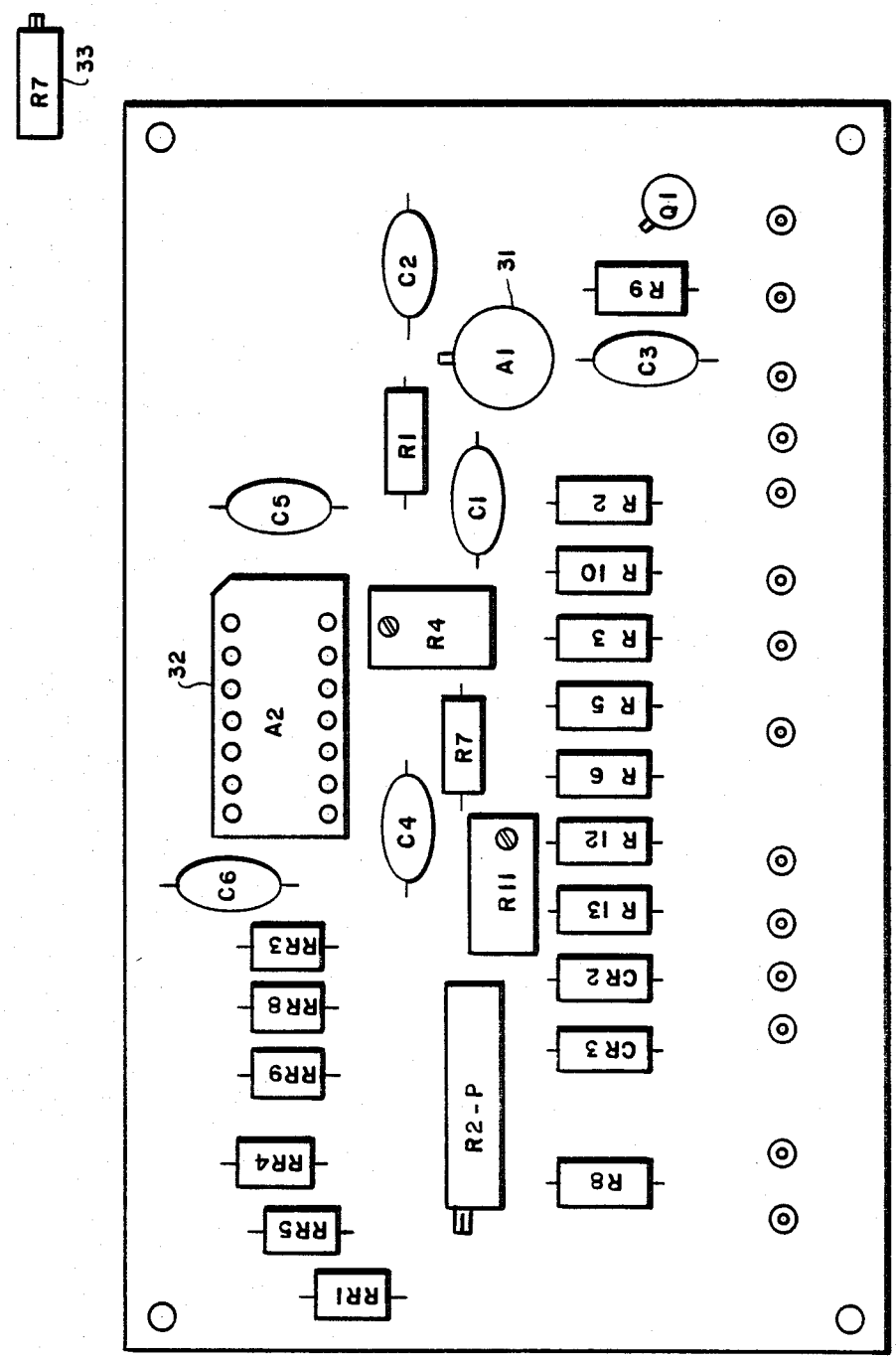
FIG. 3 is a view of the process signal board.

FIG. 3 is a view of the process signal board wherein are designated the preamplifier at 31, the amplifier at 32, and the external emissivity control pot at 33. On the board the resistors are shown at R and RR, the capacitor at C, and the transistor at Q.

Referring to FIGS. 1 and 2, the high speed infrared temperature measuring devise of the present invention is quite small and able to operate in a hostile environment.

The two stage thermo-electric cooler with the indium arsenide sensor is mounted in the To-8 type package with a fused window and hermetically sealed cap therein, is shown at 25. The cooler requires a minimum of two volt 1 amp DC power supply. The sensor is cooled down to $-30°$ C. temperature and the temperature is maintained by the control balanced bridge circuit automatic temperature control circuit 28. Circuit 28 is responsible for keeping the detector's T-E cooler at the prescribed cold temperature of $-30°$ C. The temperature is maintained by properly heat sinking the sensor cooler 25.

The heat sink, 26, with Lens Barrel, 21A, is designed and built of aluminum; the barrel, 21A, is optically coated with flat black paint to eliminate optical scatter of infrared energy. The optical barrel, 21A, also houses the objective lens, 21, which is made of IR-12 quartz quality with dimensions of about $1\frac{1}{2}''$ diameter$\times 1\frac{1}{2}''$ inch effective focal length, although the actual dimensions are dictated by the required target area and distance. This type of lens assembly will assure a fast optical focus to maintain the 50 micro seconds and below response time requirement.

Within lens barrel 21A is a thermistor 23 implanted and sealed into the barrel to monitor the barrel temperature to assure the proper offset will be maintained when the environment of the device of the present invention is exposed to higher ambient temperatures, ambient temperatures from 15° to 43° C. The compensation circuit in 20B offsets the actual recorded temperature and helps to eliminate the blackbody affect caused by the barrel 21A that is heated by the environment.

The enclosure 27 is aimed at target object 20 in a non-contact position utilizing infrared or visible radiation. The emitting body of infrared energy 20A is received by the optical lens assembly 21, which is part of the lens barrel assembly, 21A. The lens barrel 21A is optically coated with a flat black paint to help reduce reflective abraisions of the incoming infrared signal, 20A. The lens barrel 21A also contains an air purge fitting, 22, and venturies 29, which allow air turbulents to exit the front end of the lens barrel, 21A, for the purpose of keeping the lens viewing area clear from foreign particles from contaminating or blocking the lens surface, 21, and thereby reducing the optical sensing quality. The infrared signals 20A are then focused on the Indium Arsenide sensor 25 which is mounted to the back side of the optical lens barrel 21A. The sensor 25 is mounted in a T-08 package which contains a two stack thermoelectric cooler. The sensor cooler package is then enclosed with a heat sink 26 to help dissipate the T-E cooler exit heat affect. The heat sink 26 is needed to effectively keep the T-E cooler constant with ambient changes. The cold side temperature of the cooler in 25 will allow the sensor in 25 to experience a $-30$ degree C. environment. The hot side would be at a 27 degree C. dissipating factor. Therefore the properly selected heat sink is essential for proper sensor function 26.

The T-E cooler in 25 requires a DC voltage and receives this voltage from a separate low voltage power supply capable of delivering a minimum of 1 amp at 2 volt power to the cooler. To maintain the low temperature environment, a control package 28 is supplied to automatically stabilize the cooler 25 at a temperature of $-30°$ C. This is accomplished by 28 which consists of a servo loop consisting of the thermistor in the detector assembly 25 and the amplifier in the controller 28. The internal current limit of the controller 28 is set for a nominal controller setpoint and a thermistor in 25 forms the legs of a bridge and are in a 1 to 1 relationship. The automatic temperature controller 28 will allow the sensor 25 to be stabilized and isolated in its own environment. To assure that the rest of the circuits are stable in a hostile environment, cooling ports 24 are installed therein which are molded into the front portion of the housing enclosure 27. The cooling ports 24 when liquid or air is applied to both fittings, input and exit, will circulate cooling water or air through this body thereby keeping the entire sensor housing 27 within ambient restraint. The sensor 25 is processed to the main amplifier electronics package 20B signal process board shown in FIGS. 3, 4 and 5. This signal is channeled to the pre amplifier stage IC, 31, which is an instrument grade Op amp designed with precision low level signal conditioning where ultra low Vos and TCVOS, are required along with very low bias currents, and low offset currents in the order of $\pm 1$ NA.

Op amps similar to this would be the op-07, 108A and 725 available from Raytheon or National. This signal is then amplified and coupled to the second stage 32, which consists of an offset gain stage. This I.C. is a JFET input operational amplifier 32. At this point, the temperature offset control, FIGS. 3 and 4C R11, will allow adjustment of the range of the signal. For example, if the range required was 40 degrees C., all sensor signals below this level would be offset to allow only signals above this starting point to be amplified. An adjustment control, R11 in FIGS. 3 and 4C, in this stage would allow offset to this starting signal. The second stage 32 allows calibration adjustment for black body differences from actual target 20 material "emissivity. In FIGS. 3 and 4 R7 allows additional gain amplification if required.

Figure 4A:
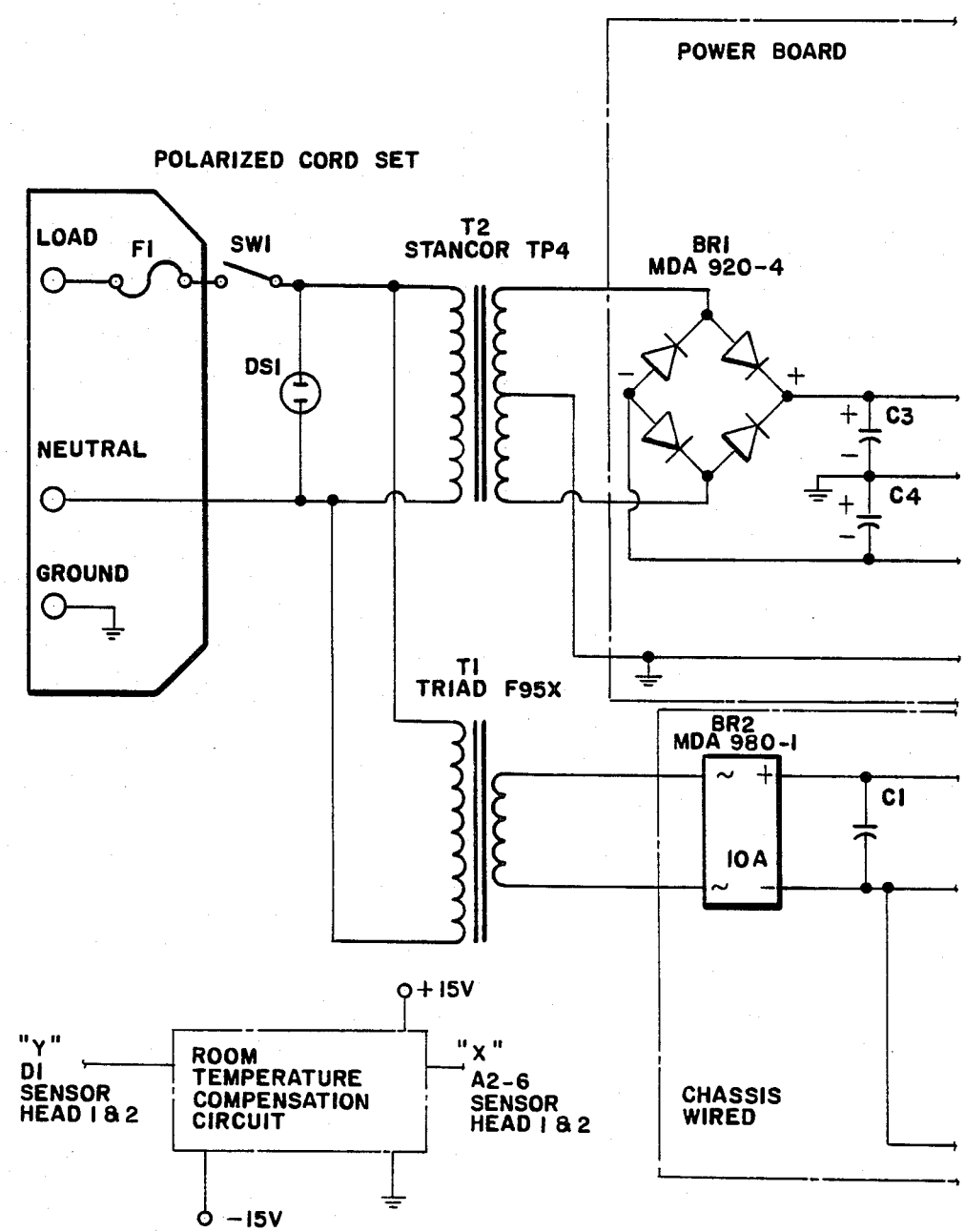
FIGS. 4A, 4B, 4C, and 4D is a schematic of the device of the present invention.
Figure 4B:
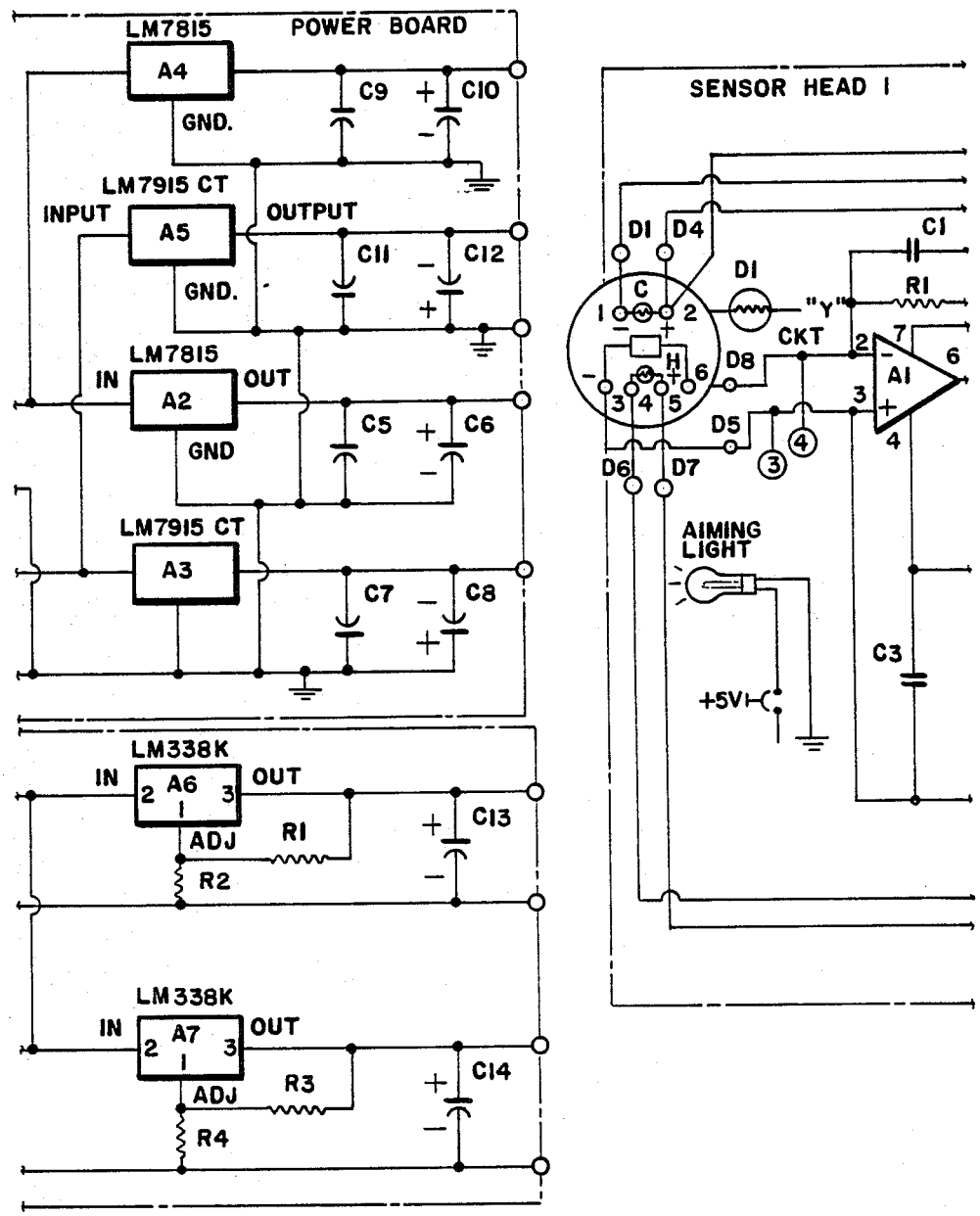
Figure 4C:
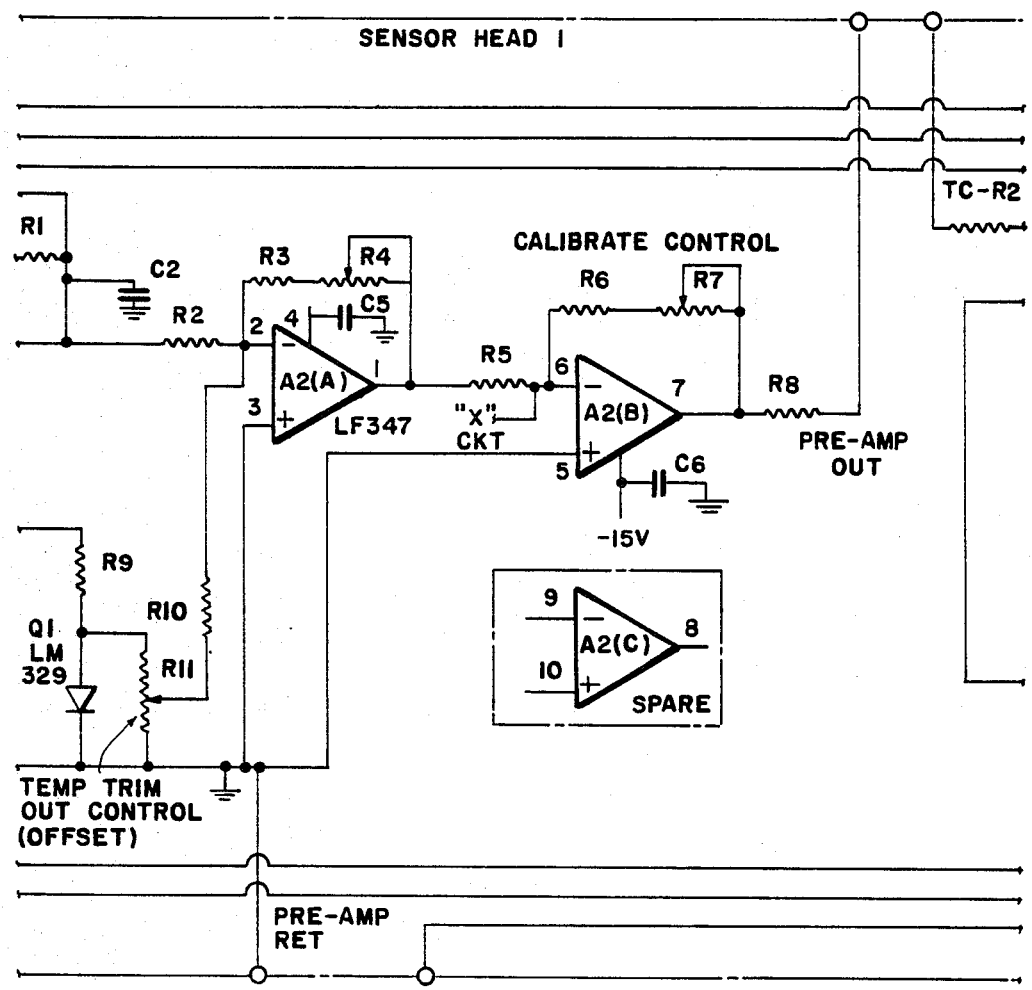
Figure 4D:
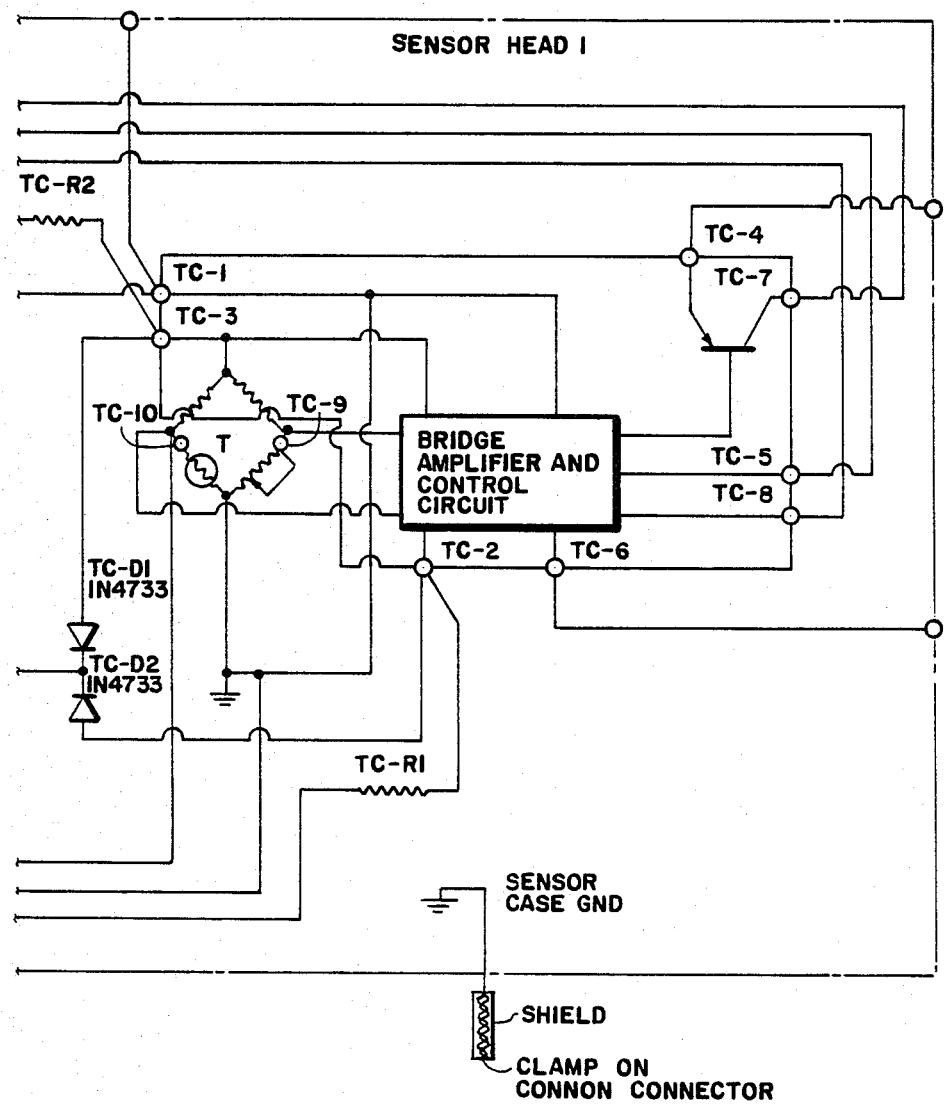
Figure 5:
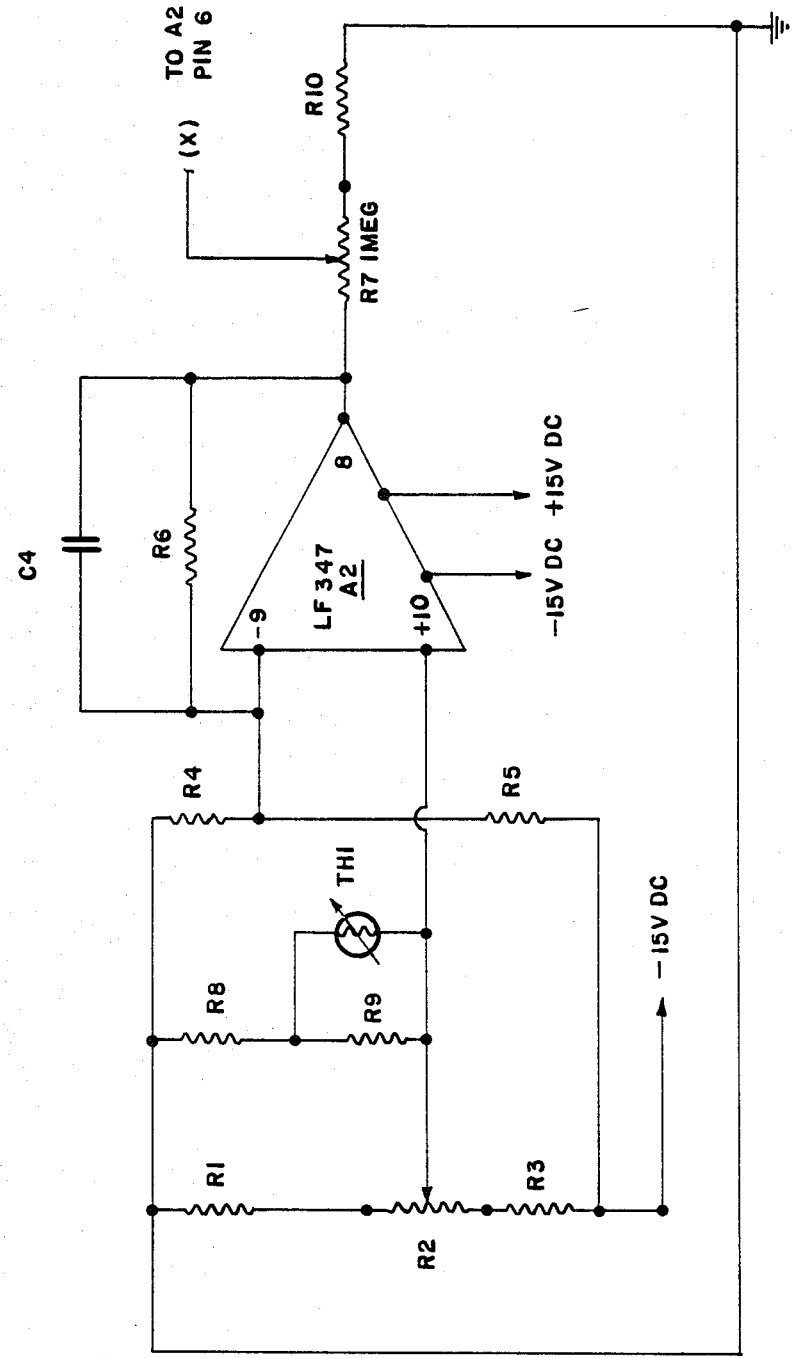
FIG. 5 is aschematic of the compensation circuit of the present invention.
Figure 6:
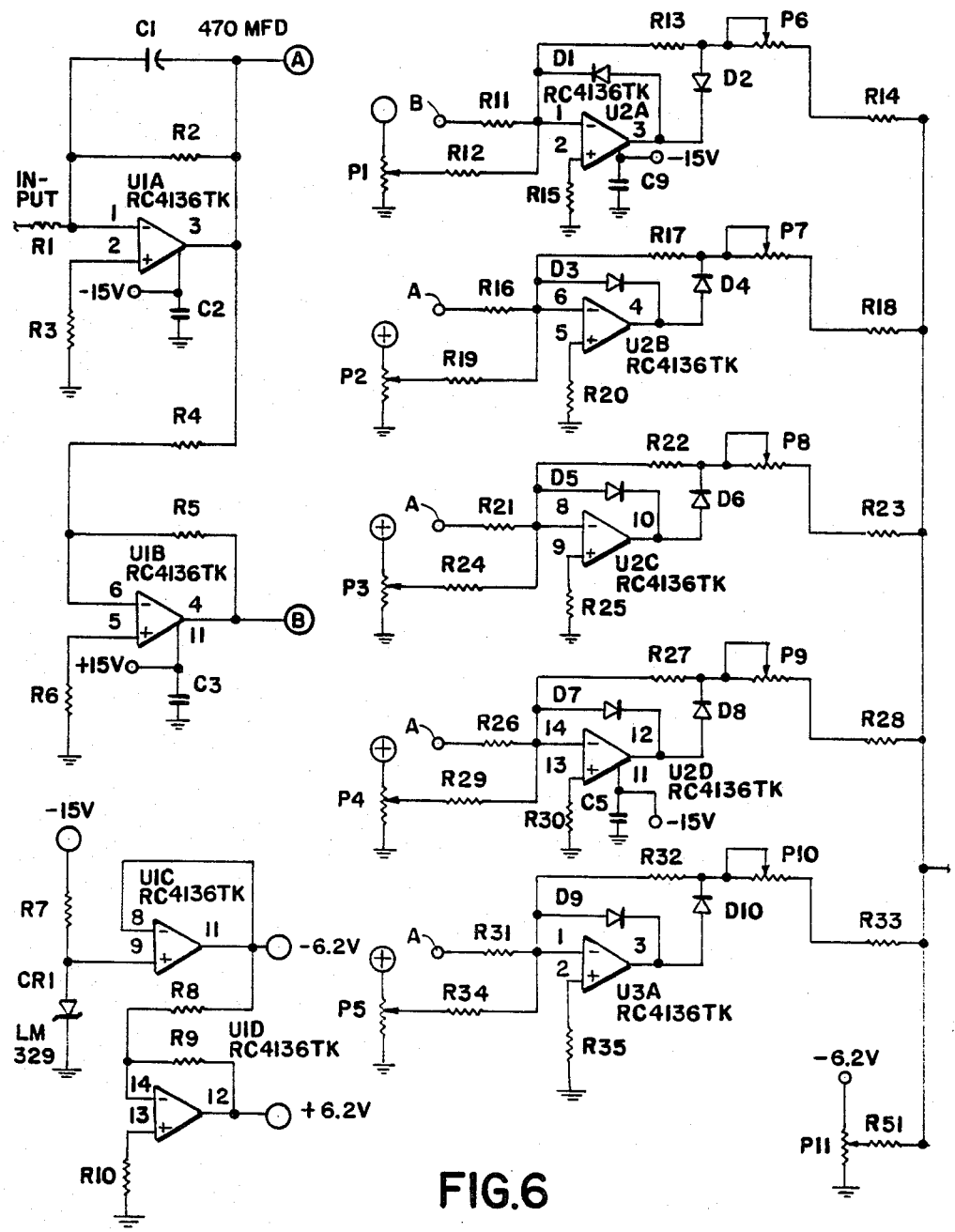
FIGS. 6, 6A is a schematic of the linearization portion of the present invention.
Figure 6A:
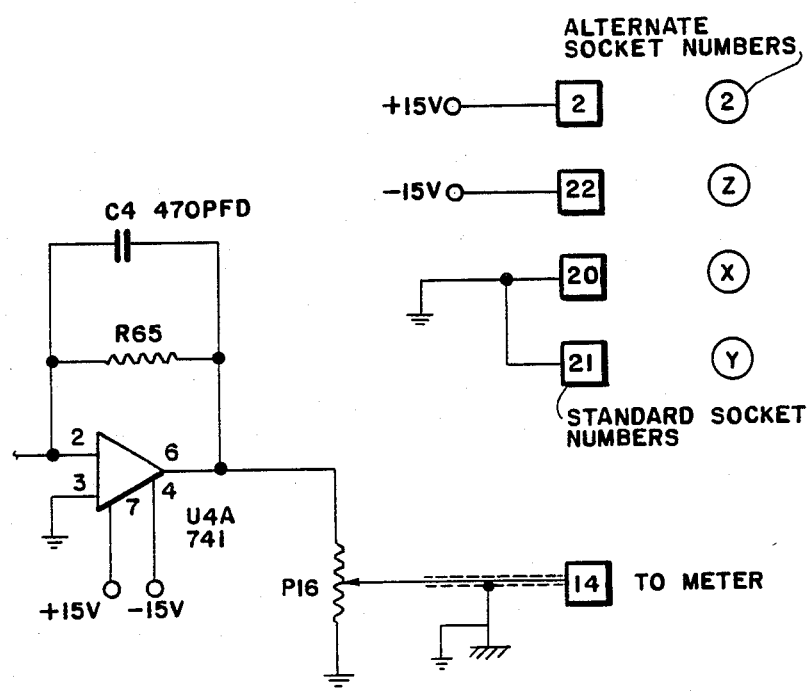

The temperature ambient's compensation circuit, see FIGS. 4A and 5, output is also connected to this stage to offset or to compensate for black body conditions which affects the instrument temperature output sensor 23. The compensation circuit 20B and FIG. 5, utilizes pins of the amp 32. The stage is used for the counter affect to black body increase, due to temperature shifts in room ambient conditions. A reference voltage derived from voltage divider R4 and R5 in FIGS. 3 and 5 in which is fed to pins in AMP 31, R1, R2 and R3, sets up a voltage range for potentiometer R2 to operate. Pot R2 is the zero adjust after the required warm up time is allowed for this system. R2 is set to zero volts at R9 and the compensation thermistor sensor 23 which is mounted in the lens barrel 21A location form a non linear resistive response to vary the output. The non linear response of TH-1, FIG. 5, (thermistor) is similar in off set caused by the black body affect. When the lens barrel 21A changes with ambient temperature causing the sensor 25 to register this lens barrel heat, the thermistor 23 will off set this false signal to sense target temperature accurately and not barrel temperature.

The output DC signal from the last stage of amp 32 in FIGS. 3 and 4 will be so scaled in calibration to produce a 0–10 VDC Non Linear output; this output will have the speed of response in micro seconds. The output of the sensor board 20B is then transmitted to a main console which houses the necessary power supplies to operate the sensor housing 27. This signal is transmitted by a instrument quality shielded cable to the main console where the Analog DC Non Linear voltage 0–10 V is then linearized to represent a linear 10 mv per degree output for computer logging, of temperature sensed, FIG. 1. Fast instrument response time is a prime factor for many non-contact temperature sensing areas where destructive testing is required to improve product quality such as, but not limited to, analyzing tires, race car and airplane, in simulated dynamometer tests. These tires are rotated in excess of 300 miles/hour and put under stress to simulate a blow out condition. Temperature of the tire is important to establish tire stress and many other factor in belt separation before the tire explodes. The need for a fast Non Contact Infrared unit such as the device of the present invention was a prerequisite to obtain valuable data unattainable in the past. Other areas of high speed testing are jet turbine aircraft engines, car fan belt analysis etc. Response time is a function of many factors; the responsivity of a sensor is a measure of the signal voltage developed by the detector when exposed to a known amount of Infrared power. This value is normally expressed in volts/watts or NEP or D star.

The sensor time constant will indicate the detector responsivity as a function of modulated frequencies and time.

A 25 micro second response time instrument has been developed in which its outputs are accessible by either analog 0–10 VDC output Non Linearized or by 10 milli volts per degree C. or F. linear output with respect to actual temperature recorded.

Although the present invention has been described and illustrated in detail it is clearly understood that the same is by way of illustration and example only and its not to be taken by way of limitation, the spirit and scope of the present invention being limited only by the term of the appended claims.

I claim:

1. High speed infrared non-contact temperature sensing apparatus wherein there is provided an infrared sensor, said sensor is in a lens barrel with a lens therein, said lens barrel being provided with an air purge fitting and entrance and exit venturi ports for passage of purging air, said lens barrel being further provided with a barrel temperature compensation thermistor, said thermistor being connected to a compensation circuit which adjusts an output of amplifying means to compensate for the black body effects of said barrel, said infrared sensor contained therein consists of a thermoelectric cooler, a photovoltaic sensing element and a sensing thermistor, said thermoelectric cooler and serving thermistor being connected to an automatic cooling control module to maintain the sensor at a predetermined temperature, said lens barrel having a heat sink formed as an integral part of the sensor to dissapate heat from the thermoelectric cooler, said barrel disposed in an instrument housing and positioned to permit the sensor to receive an infrared signal from a non-contact target area, the sensor outputs a detected signal to the amplifying means, the output of the amplifying means is thereafter received by an output means which provides a temperature signal, said instrument housing being provided with means for circulating a cooling liquid.

2. The apparatus of claim 1 wherein said lens being of no greater than f-1.0 power.

3. The apparatus of claim 1 wherein said lens barrel temperature thermistor operates in an ambient range of from above 15 degrees C.

4. The apparatus of claim 1 wherein said heat sink being capable of dissipating exhaust heat of said infrared sensor.

5. The apparatus of claim 1 wherein the target area is in a range as small as about 6 mm. at a distance of about 300 mm.

6. The apparatus of claim 1 said response time is as low as 25 micro seconds.

7. The apparatus of claim 1 wherein the output means temperature signal is received by a linearizing circuit which provides a linearized signal to to one of a recording, monitoring and controlling means.

8. High speed infrared non-contact temperature sensing apparatus wherein there is provided an infrared sensor, said sensor is in a lens barrel with an f-1.0 lens therein, said barrel being provided with an air purge fitting with entrance and exit ports for passage of purge air, said lens barrel being further provided with a barrel temperature compensation thermistor, said thermistor being connected to a compensation amplifying circuit and operating in an ambient range of from about 15 degrees C. to compensate for black body effects of the barrel; said infrared sensor contained therein consisting of a thermoelectric cooler, a photovoltaic sensing element and a sensing thermistor, said thermoelectric cooler and sensing thermistor are connected to an automatic cooling control module which maintains the sensor at a predetermined temperature, said lens barrel having a heat sink capable of dissipating sufficient exhaust heat of said infrared sensor; said lens barrel deposed in an instrument housing and positioned to receive an infrared signal from a non-contact target area as small as 6 mm. at a distance of about 300 mm., said signal sent to an amplifying means and thereafter to an output means, which provides an output signal adjusted by said compensation amplifying circuit said output signal resulting in a response time as low as 25 micro seconds from receipt of said infrared signal, said output means connected to a linearizing circuit and in turn to recording, monitoring or controlling means.

* * * * *